United States Patent Office 2,733,835
Patented Feb. 7, 1956

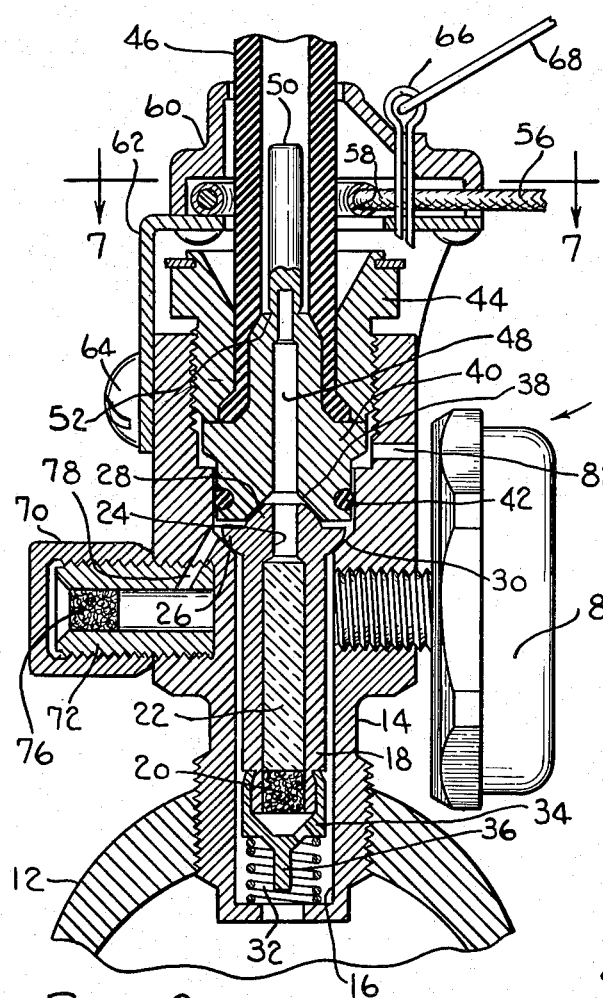

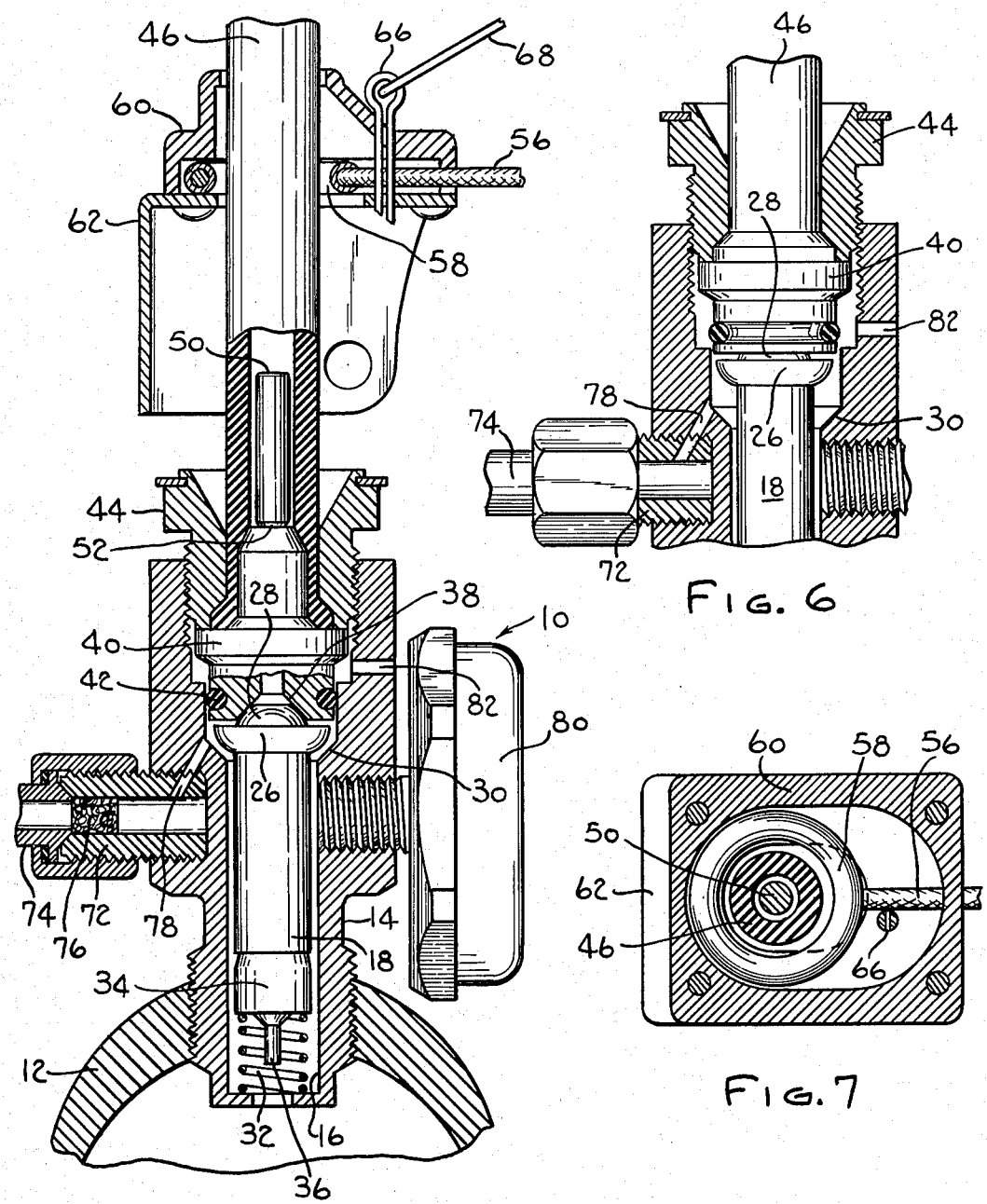

2,733,835

DISPENSING VALVE FOR EMERGENCY OXYGEN CYLINDERS

Henry F. Alfery, Hales Corners, and Richard K. Engholdt, Milwaukee, Wis., assignors to Erie Manufacturing Co., Milwaukee, Wis., a corporation of Wisconsin Application October 30, 1952, Serial No. 317,702

8 Claims. (Cl. 222—5)

This invention relates to emergency bail-out oxygen cylinders and particularly to the valve assembly for such cylinders.

Emergency bail-out oxygen cylinders are used by the operating personnel of high altitude aircraft to provide a temporary or emergency oxygen supply in the event that the regular oxygen supply should malfunction or in the event that it become necessary for the personnel to leave the aircraft. As will be explained more fully hereinafter, the cylinder is placed into operation by pulling the pull cable ball to break open the restricted outlet from the cylinder and permit flow from the cylinder at a predetermined rate. Normally these cylinders are designed to provide a flow rate of ten to twelve liters during the first minute and approximately one liter during the tenth minute (assuming an initial pressure of eighteen hundred pounds per square inch in the cylinder). These flow rates are ample when it is remembered that the personnel are decreasing the altitude during the ten minute period and at the end of ten minutes will be at an elevation requiring no further oxygen. For example, even when descending by parachute from an elevation of forty thousand feet the personnel will be at approximately twenty thousand feet at the end of ten minutes.

The cylinder valve assembly is, as noted above, partially fractured when using the cylinder and in order to reuse the cylinder the fractured part must be replaced. Since the unit is designed for such operation parts are readily available for this replacement. However, on the inlet or charging nipple prior cylinders of this type were provided with a check valve which generally froze in its seated position and therefore required replacement when it was desired to recharge the cylinder. These parts were not always available and even if available such malfunctioning of the inlet check valve represents a costly waste. The present invention eliminates the need for the check valve in the charging nipple and effects a great simplification in the fabrication and maintenance of these emergency cylinders.

The principal object of this invention is to simplify and improve emergency bail-out oxygen cylinders and particularly the valve assembly of such cylinders.

A further object of this invention is to simplify the recharging of emergency bail-out oxygen cylinders.

Still another object is to eliminate the inlet nipple check valve assembly found in previous emergency bail-out oxygen cylinders.

Still another object is to reduce the cost of fabrication and of maintenance of the valve assemblies on emergency bail-out oxygen cylinders.

A still further object is to provide an improved valve assembly for emergency bail-out oxygen cylinders which is designed to replace prior types of similar equipment while being interchangeable with older type valves to prevent absolescence of the equipment of this type already in the field.

Other objects and advantages will be pointed out in, or be apparent from, the specification and claims, as will obvious modifications of the single embodiment shown in the drawings, in which:

Fig. 1 is an elevation of a complete emergency bail-out oxygen cylinder;

Fig. 2 is a fragmentary cross section of the valve assembly of the cylinder shown in Fig. 1 with the valve assembly in its charged condition with the caution tag cotter pin in place preventing placing the cylinder into operation;

Fig. 3 is a fragmentary cross section of the valve assembly showing the manner in which the pull cable is actuated to fracture the break-off nipple;

Fig. 4 is similar to Fig. 3 but shows the fracture of the break-off nipple completed and the flow established through the valve assembly;

Fig. 5 is a vertical section through the valve assembly showing the manner of charging the cylinder;

Fig. 6 is similar to Fig. 5 but shows the safety vent in use to prevent charging the cylinder when the nipple nut has been backed off to a dangerous extent; and Fig. 7 is a section of Fig. 2 on line 7—7 showing the pull cable ring and its relationship to the tube and the break-off nipple.

As may be seen in Fig. 1 the valve assembly 10 is mounted on the oxygen cylinder 12. This cylinder normally has an internal volume of twenty-two cubic inches and is designed for safe operation at pressures between 1800 and 2200 pounds per square inch. The valve assembly includes a valve body 14 which is threaded into the head of cylinder 12. The valve body is provided with a bore 16 which receives a sleeve 18 which carries a coarse metallic filter 20 and a ceramic filter 22 in the central bore 24 thereof. The sleeve 18 has a dished annular shoulder 26 at its upper end and a generally spherical seat 28 as will be explained more fully hereinafter. The sleeve 18 is normally retained in the position shown in Fig. 2 wherein shoulder 26 seats against the generally conical seat 30 in the valve body to prevent flow from the cylinder past the annular shoulder and the sleeve. The sleeve is retained in this position against the bias of spring 32 compressed between the lower end of the valve body 14 and the uni-ported cap 34 carried by the lower end of sleeve 18. It will be readily appreciated that cap 34 is not necessary to the instant design. The cap is provided for permitting use of the instant sleeve assembly in older type valves wherein the depending pin 36 carried by the cap is adapted to actuate a check valve located in the lower end of the valve body.

The generally spherical seat 28 at the top of sleeve 18 rests against the generally conical seat 38 provided on the lower end of break-off nipple 40. The break-off nipple is provided with an O ring seal 42 which co-operates with the inner wall of the valve body 14 to prevent leakage. The break-off nipple 40 is held down against the sleeve 18 by means of the nipple nut 44 threaded into the top of the valve body 14. The nut additionally serves to clamp tube 46 to the valve assembly.

It will be noted that the nipple 40 is provided with a central bore 48 which is adapted to communicate and generally align with the bore 24 in sleeve 18. The nipple bore 48 is narrower at its upper end and continues into the break-off portion 50 of the nipple. The break-off portion merely comprises a stem projecting upwardly from the nipple and integral with the nipple. However, the point of connection between the break-off portion and nipple 40 is slightly notched as at 52 to develop a predetermined fracture point which will fracture with a predetermined application of force on the pull cable ball 54 clamped to cable 56. The general design requirements call for a sixteen pound pull on the cable 56 but permit up to approximately twenty pound pull on the cable.

Pull cable 56 includes a ring 58 which encircles tube 46 and the upper end or break-off portion 50 of the nipple 40. The pull cable ring 58 is mounted within a housing 60 connected to housing base 62 which is removably secured to the valve body by means of a plurality of screws 64. The housing is provided with a suitable pair of aligned apertures to receive cotter pin 66 which projects through the housing in such a manner as to prevent moving the ring 58 sufficiently for the ring to fracture the break-off portion 50 from nipple 40. However, upon removal of the cotter pin 66 and the caution tag 68 connected to the cotter pin, the ring is free for actuation when the pull cable ball is yanked. When this occurs the ring slides to the right as shown in Fig. 3 and deforms tube 46 to exert force on break-off portion 50 to fracture the nipple as shown in Fig. 3. The ball handle may now be released and oxygen is free to flow from the cylinder through the metallic filter, the ceramic filter 22, bore 24 of valve body 14, and thence through bore 48 in the break-off nipple 40 to the interior of tube 46 which is, of course, connected to the oxygen mask. Fig. 4 illustrates the discharge position of the parts. It is to be noted that the break-off portion 50 of the nipple 40 is not shown in Fig. 4; it being assumed that the stream of oxygen may carry the break-off portion downstream along the length of the tube. It is to be noted, however, that in all cases the break-off portion does not break off and may remain connected by a fragment of metal.

After the cylinder has been used it must be recharged before being used again. It will be readily appreciated that nipple 40 must be replaced since the break-off portion 50 has been fractured from the nipple. Replacement is readily effected by disconnecting the housing base 62 from the valve body 22 and moving it along tube 46 as shown in Fig. 5. Nut 44 may now be removed to permit removal of the fractured nipple 40 and replacement with a new part. When reassembling the valve assembly the nut is turned down until the parts seat as shown in Figs. 2, 3, and 4 and the nut is then backed off approximately one-half turn to occupy the position shown in Fig. 5. It will be noted that in this position sleeve 18 is moved upwardly by spring 32 so that the annular shoulder 26 no longer seats on the valve body seat 30. Cap 70 on inlet nipple 72 may now be removed to allow connection of charging conduit 74 to the inlet nipple 72 as shown in Fig. 5. Oxygen is introduced through the metallic filter 76 in the inlet nipple and through the diagonal bore 78 connecting the nipple 72 to the interior of the valve body above the position normally occupied by the annular shoulder 26 and below the O ring seal 42. However, as may be seen in Fig. 5, backing nut 44 off a number of turns permits the annular seat to move from its seat 30 on the valve body to open a passage down the exterior of the sleeve 18 to the interior of the cylinder. Therefore, the path for the charging oxygen is through nipple 72, diagonal bore 78, and between the body and sleeve 18. When pressure gauge 80 connected to the interior of the cylinder through the valve body 14 below shoulder 26 on sleeve 18 indicates that at least 1800 pounds pressure obtains the nipple nut 44 is tightened to move the parts down to the position shown in Fig. 2 where the annular shoulder on sleeve 18 will seat on the valve body to thus seal off the oxygen within the cylinder. It will be appreciated that the charging conduit 74 may be disconnected from the inlet nipple after the sleeve has been seated as shown in Fig. 2 without danger of oxygen leaking from the cylinder. It will be appreciated that leakage during the charging operation is prevented by the O ring seal 42.

Spring 32 acts to unseat sleeve shoulder 26 from seat 32 for fast charging when nut 44 is backed off. If the spring was omitted shoulder 26 could remain seated when the nut was backed off and the bottle could be charged through filters 20, 22 but the charging time would increase due to the restrictions in the flow path. Therefore, while spring 32 opens a by-pass line for fast charging the spring may be omitted if desired.

If nut 44 is backed off to a point where the number of threads remaining in engagement with the valve body is insufficient to withstand the high pressure to which the cylinder is to be charged the O ring seal is moved upwardly to a larger diameter portion of the valve body (as shown in Fig. 6) to open an escape path for the oxygen through safety vent 82. This prevents charging the cylinder under dangerous conditions.

In former equipment of this general type the inlet nipple connected directly into the valve body in a manner as if the present nipple were bored on through until it connected with bore 16 in the valve body. By connecting the nipple to the space above the annular shoulder on the sleeve 18 we have been able to eliminate the check valve found in the prior art in the inlet nipple. We merely manipulate the nipple nut 44 to obtain the desired valving operation without otherwise impairing the usual function of the parts. It will be appreciated that we have completely eliminated the check valve structure without adding any structure to take over the functions previously performed by the check valve. Modifications of the illustrated structure may occur to those skilled in the art and for this reason we desire to be limited only by the scope of the claims.

We claim:

1. A valve assembly for emergency oxygen cylinders comprising, a valve body adapted for connection to the cylinder and having a bore therethrough, a centrally bored sleeve mounted within said body bore and spaced therefrom, a seat on said sleeve, a break-off nipple mounted in said body and adapted to contact one end of said sleeve to effect a seal therebetween, means for sealing said nipple with respect to the body, a seat on the body, a nut threaded in the body and acting on said nipple and said sleeve to urge the sleeve seat into contact with the body seat and operable to permit movement of the nipple and the sleeve away from the body seat, and an inlet nipple connected to the interior of the valve body in the space between said sealing means and the point of contact between the sleeve seat and the body seat, said break-off nipple having a bore extending through a portion of its length for general alignment with the sleeve bore and having a portion of the nipple adapted for fracture from the major portion of the nipple to open the bore of the nipple to the exterior of the valve assembly.

2. A valve assembly according to claim 1 including spring means urging said sleeve in a direction to move the sleeve seat out of contact with the body seat.

3. A valve assembly according to claim 1 and including an enlarged bore portion in said valve body, and a safety vent connecting said enlarged bore to the exterior of the valve assembly to permit free flow of oxygen directly to the exterior of the body when the nut has been backed off to a position in which the sealing means is no longer effective to seal the nipple with respect to the valve body.

4. A valve assembly for use on oxygen cylinders comprising, a valve body adapted for connection to a cylinder and provided with an axial bore therethrough, an axially bored sleeve having an external diameter less than the internal diameter of the bore in the valve body and mounted in the valve body, a seat in the valve body bore, an annular shoulder on the sleeve adapted to contact said seat to prevent flow between the body and the sleeve and adapted for movement from the seat to allow flow between the body and the sleeve, a nipple assembly mounted in the body bore and adapted to sealingly contact the sleeve, said nipple assembly being provided with an axial bore which extends through a substantial length of the assembly and which generally aligns with the bore in said sleeve, and a nut threadably engaging said valve body and acting on said nipple assembly to adjustably move the assembly and the sleeve in a direction forcing the sleeve shoulder into contact with said body seat or in a direction permitting said shoulder to move out of contact with the seat, means sealing said nipple assembly with respect to the body bore, and an inlet conduit extending through the body and terminating in the space between said sealing means and the point of contact between said shoulder and said seat, flow from said conduit to the interior of the cylinder being permitted by moving said nut to allow said shoulder to move out of contact with said seat.

5. A valve assembly according to claim 4 including spring means acting on said sleeve in a direction to move said shoulder out of contact with said seat.

6. A valve assembly according to claim 4 including a safety vent comprising a conduit through the valve body at a point sealed from said inlet conduit by said sealing means in the normal positions of said sealing means and open to said inlet conduit when the nut is manipulated to move the nipple assembly and the sealing means to an unsafe position.

7. A valve assembly according to claim 4 in which said sealing means comprises an O ring mounted in a peripheral groove in the nipple assembly and cooperable with the inner wall of the valve body bore to prevent leakage past the O ring, and including a safety vent comprising a conduit through the wall of the valve body at a point axially spaced from said inlet conduit so that the O ring seal normally lies between the inlet conduit and the safety vent but at a point which is exposed when the nut has been backed off from the valve body to such an extent that the nipple assembly and O ring have moved to a point where the O ring no longer contacts the valve body bore, such a position corresponding to the position when the threads engaging between the nut and the valve body are insufficient to withstand the rated pressure charge of the cylinder.

8. A valve assembly for emergency oxygen cylinders comprising, a valve body adapted for connection to the cylinder and having a restricted bore therein for metering flow from the cylinder, a seat surrounding one end of said bore, a break-off nipple mounted in said body and adapted to contact said seat to effect a seal therebetween, means for sealing said nipple with respect to said body, a nut threaded in the body and acting on said nipple to urge the nipple into contact with said seat and operable to permit movement of the nipple away from the position it occupies when seated, a bore extending through a portion of the length of said nipple and being in general alignment with said restricted bore, another portion of said nipple being adapted for fracture from the rest of the nipple to open the nipple bore to the exterior of the valve assembly, and an inlet nipple connected to the interior of the valve body between said seat and said sealing means so that movement of the break-off nipple away from said seat will open a flow path between the inlet nipple and the restricted bore.

References Cited in the file of this patent

UNITED STATES PATENTS

| | | |
|---|---|---|
| 2,395,439 | Wilson et al. | Feb. 26, 1946 |
| 2,423,792 | Norway | July 8, 1947 |